2,835,604
DYE STICK AND PROCESS OF MAKING IT

Lester Aronberg, Chicago, Ill.

No Drawing. Application September 28, 1953
Serial No. 382,829

16 Claims. (Cl. 106—243)

My invention relates to the preparation of coloring dye compositions in stick, rod and like forms, and is particularly concerned with new and useful compositions for use by children.

The conventional forms of coloring materials used by children are crayons, chalk, oil paints or water paints applied with a brush, and, of more recent origin, so-called finger paints. Crayons and chalk do not produce the effects of paints and their compositions are radically different from and unrelated to paints. Oil paints or water paints of the type which are applied with a brush possess a number of disadvantages so far as use by children is concerned since they are somewhat cumbersome to use and, even in the case of water paints, there is some difficulty in washing them out of fabrics and the like with which they may inadvertently come into contact. The so-called finger paints are objectionable because of the messiness associated with their use.

In accordance with my invention, coloring dye compositions are produced of such composition and in such form that they obviate numerous of the disadvantages which have inhered in heretofore known coloring products. The coloring dye compositions of my present invention are made in the configuration of sticks, rods or pencils or the like and their composition is of such character that they function in a manner akin to and produce coloration effects similar to those obtained by paints. They are simple to use, avoid messiness, and are readily washed out from fabrics and the like with which they may accidentally come into contact.

In the production of coloring dye compositions in accordance with my invention, an aliphatic amine, particularly an hydroxy-alkyl amine, such as triethanolamine, is admixed with a powdered water-soluble non-toxic organic dye in the initial stage of the process, the aliphatic amine being in liquid form and being advantageously maintained at a temperature not substantially in excess of room temperature. An addition compound appears to form initially which then partially dissolves or partially disperses. With certain aliphatic amines, for example, monoethanolamine, almost a clear solution is obtained when the powdered dye is admixed with said amine whereas, in other cases, for instance, with triethanolamine, a somewhat turbid dispersion or solution results. A normally solid higher molecular weight fatty acid, for instance, stearic acid, is then added, in dry form, as, for example, in the form of flakes, chips, beads or the like, advantageously at not substantially in excess of room temperature, the resulting mixture being agitated or stirred. It is thereupon heated to about 100–120 degrees C., whereupon a relatively clear free-flowing liquid is obtained which is then poured into molds and then allowed to cool in such molds whereby to convert the mixture into the form of rods, pencils, sticks or the like. The addition of the normally solid higher molecular weight fatty acid to the amine-dye mixture or addition compound not only results in the formation of a water-soluble amine soap but serves also to restore the dye to its original state. In this connection, it may be pointed out that when the powdered dye is added to the amine and the aforementioned addition compound or complex is produced, a change in the character and color of the dye takes place. When the stearic acid or similar normally solid higher molecular weight fatty acid is added to said amine-dye mixture, the dye again changes color and appears to be restored to substantially its original shade. The stearic acid or similar fatty acid is utilized in proportions substantially of the order to form a soap with the amine but somewhat of an excess of the acid can be utilized without deleterious effect.

It has been found to be particularly advisable to follow the procedure described above. In this connection, it may be observed that if the dye is added to the amine at relatively elevated temperatures, for example, of the order of 100–120 degrees C., a tarry mass of a substantial amount of the dye appears to form, with the result that, when the stearic acid or the like is added, an appreciable proportion of the dye does not disperse through the composition and, for all practical purposes, the effectiveness of that undispersed portion of the dye is lost. In view of the fact that many of the organic dyes are costly, serious economic losses arise unless the full values of the amount of dye utilized are obtained.

I have also found it to be particularly desirable, from the standpoint of enhancing the shelf life of the aforementioned compositions, to incorporate therein appreciable proportions of a potassium soap of normally solid higher molecular weight fatty acids, especially satisfactory results being obtained through the utilization of potassium stearate. The amount of potassium stearate utilized is most effectively in the range of about 25% to about 45% by weight of the entire paint composition.

It is important that the dyes which are utilized in accordance with my present invention be of water-soluble, non-toxic character, and soluble or dispersible in the amines. Typical examples of such dyes are those of the acid type and are exemplified best by those dyestuffs which are utilized in foods, typical examples of such dyes being orange I, tartrazine, and amaranth.

The amines which are utilized in the preparation of the compositions of my present invention are those of aliphatic character and which form solid soaps at room temperature with normally solid higher molecular weight fatty acids exemplified, particularly, by palmitic acid and stearic acid or mixtures thereof such as are found, for instance, in triple-pressed stearic acid. I have found it to be particularly desirable to utilize hydroxy-alkyl amines, which may be of primary, secondary or tertiary character, and which are exemplified especially by monoethanolamine, diethanolamine, triethanolamine, monopropanolamine, monoisopropanolamine, diisopropanolamine, glycerol amines, alkyl alkylol amines such as monomethyldiethanolamine, diethylethanolamine, etc. Other specific types of amines which can be used are the alkylene polyamines such as ethylenediamine, diethylenetriamine, triethylenetetramine, and hydroxy-alkyl polyamines exemplified by hydroxy-ethylethylenediamine. I have found that triethanolamine is particularly satisfactory and I regard its use as an especially important embodiment of my present invention.

Supplemental agents can be utilized in the coloring dye compositions of my present invention, such agents being, for instance, waxes of various types such as paraffin wax, beeswax, water-soluble synthetic waxes, the so-called "Carbowaxes," particularly those having molecular weights of the order of 4,000 or higher. Such supplemental agents are, in general, used in relatively minor proportions in the composition although, in the case of certain of said "Carbowaxes," for instance, "Carbowax 4,000," the latter may constitute a substantial proportion of the paint composition, for instance, of the order of 20 to 30%.

The proportions of the ingredients comprising the coloring dye compositions of my present invention are somewhat variable. In all cases, the aliphatic amine soaps will constitute the major or one of the major constituents and the organic dye will constitute a distinctly minor constituent. In general, the dye will comprise from about 1% to about 5% of the coloring dye composition and will usually fall into the range of about 1% to about 3%. The normally solid water-soluble soap of the aliphatic amine with the higher molecular weight fatty acid will, in the usual case, comprise from about 40 to about 60%, by weight, of the coloring dye composition, and, where potassium soaps such as potassium stearate are utilized, they will ordinarily fall within the range of proportions of about 25 to about 45%, by weight, of the coloring dye composition.

The following examples are illustrative of coloring dye compositions made in accordance with my invention. It will be understood that other compositions can readily be evolved in the light of the teachings and guiding principles disclosed herein and, therefore, the examples are to be understood as illustrative and by no means limitative of the full scope of my invention.

Example 1

To 10 pounds of triethanolamine, at room temperature, 1 pound of orange I, in the form of a powder, are added with stirring. Thereupon, 20 pounds of flaked triple-pressed stearic acid are added, with stirring. The resulting mixture is then heated, while stirring, to about 110 degrees C. while adding thereto 20 pounds of potassium stearate. A clear, free-flowing liquid mass is obtained which is then poured into molds, in the shape of rods or cylindrical sticks, and then the mass is allowed to cool and solidify in said molds.

Example 2

To 15 pounds of triethanolamine, at approximately room temperature, 1.8 pounds of powdered tartrazine is added and the resulting mixture is vigorously stirred. Thereupon, 30 pounds of flaked triple-pressed stearic acid is added, with stirring, the resulting mixture is heated to 115 degrees C., and then poured into molds and allowed to cool and solidify in the form of sticks.

Example 3

To 10 pounds of monoethanolamine, at approximately room temperature, 0.8 pound of orange I is added, with stirring, 30 pounds of flaked triple-pressed stearic acid is added, with stirring, the resulting mixture is heated to 110 degrees C. and then poured into molds to convert the mixture into stick form.

Example 4

To 10 pounds of hydroxyethylethylenediamine there is added 1 pound of amaranth, with stirring, and thereafter 40 pounds of flaked palmitic acid is added, with stirring, 18 pounds of potassium stearate is then added, also with stirring, and the mixture is heated to 110 degrees C. It is then poured into molds and allowed to cool and solidify to convert the product into stick form.

In the use of the coloring dye compositions of the present invention, the end of the stick is dipped into water and then the stick is utilized in the same way that an ordinary crayon would be employed. Coloring effects generaly similar to those of paints are obtained. The coloring dye compositions of my invention are intended for painting on paper but they can be used on other surfaces. Where the color comes into contact inadvertently with clothing, rugs, the fabrics of furniture, etc., no damage results since the color can readily be washed out with soap and warm water or, for that matter, with warm water alone.

The term "stick" is used in the claims to encompass a solid body of elongated character of the general configuration of a rod, stick, pencil or similar body.

What I claim as new and desire to protect by Letters Patent of the United States is:

1. A method of preparing a coloring dye stick which, upon being moistened with water, can be used to color paper and other surfaces and which is adapted readily to be washed from fabrics with soap and water, which consists essentially in admixing a normally solid higher molecular weight fatty acid with a normally liquid aliphatic amine containing a minor proportion of a water-soluble non-toxic organic dye in solution or dispersion in said amine, whereby to form a normally solid soap of said amine and said fatty acid, maintaining said resulting composition in liquid form, and then solidifying said composition in the form of sticks.

2. A method of preparing a coloring dye stick which, upon being moistened with water, can be used to color paper and other surfaces and which is adapted readily to be washed from fabrics with soap and water, which consists essentially in admixing a normally solid higher molecular weight fatty acid with a normally liquid hydroxy-alkyl amine containing a minor proportion of a water-soluble non-toxic organic dye in solution or dispersion in said amine, whereby to form a normally solid soap of said amine and said fatty acid, maintaining said resulting composition in liquid form, adding thereto a potassium soap of a normally solid higher molecular weight fatty acid in an amount from about 25 to about 45% by weight of said dye stick, and then solidifying said composition in the form of sticks.

3. A method of preparing a coloring dye stick which, upon being moistened with water, can be used to color paper and other surfaces and which is adapted readily to be washed from fabrics with soap and water, which consists essentially in admixing stearic acid with triethanolamine containing a minor proportion of a water-soluble non-toxic organic dye in solution or dispersion in the triethanolamine, whereby to form a normally solid soap of said stearic acid and triethanolamine, maintaining said resulting composition in liquid form, and then solidifying said composition in the form of sticks.

4. A method of preparing a coloring dye stick which, upon being moistened with water, can be used to color paper and other surfaces and which is adapted readily to be washed from fabrics with soap and water, which consists essentially in admixing stearic acid with triethanolamine containing a minor proportion of a water-soluble non-toxic organic dye in solution or dispersion in the triethanolamine, maintaining said resulting composition in liquid form, adding potassium stearate thereto in an amount from about 25 to about 45% by weight of said dye stick, and then solidifying said composition in the form of sticks.

5. A method of preparing a coloring dye stick which, upon being moistened with water, can be used to color paper and other surfaces and which is adapted readily to be washed from fabrics with soap and water, which consists essentially in admixing a normally liquid aliphatic amine with a minor proportion of a water-soluble non-toxic organic dye at not substantially in excess of room temperature to effect solution or dispersion of said dye in said amine, then admixing therewith a solid higher molecular weight fatty acid capable of forming a normally solid soap with said amine, heating said mixture to a temperature in the range of about 90–120 degrees C., and then solidifying the resulting composition in the form of sticks.

6. A method of preparing a coloring dye stick which, upon being moistened with water, can be used to color paper and other surfaces and which is adapted readily to be washed from fabrics with soap and water, which consists essentially in admixing a normally liquid aliphatic amine with a minor proportion of a water-soluble non-toxic organic dye at not substantially in excess of room temperature to effect solution or dispersion of said dye in said amine, then admixing therewith a solid higher molecular weight fatty acid capable of forming a normally solid soap with said amine, heating said mixture to a temperature in the range of about 90–120 degrees C., adding a normally solid potassium soap of a normally solid higher molecular weight fatty acid in an amount from about 25 to about 45% by weight of said dye stick, and then solidifying the resulting composition in the form of sticks.

7. A method of preparing a coloring dye stick which, upon being moistened with water, can be used to color paper and other surfaces and which is adapted readily to be washed from fabrics with soap and water, which consists essentially in admixing a normally liquid hydroxy-alkyl amine with a minor proportion of a water-soluble non-toxic organic dye at not substantially in excess of room temperature to effect solution or dispersion of said dye in said amine, then admixing solid stearic acid therewith, heating said mixture to a temperature in the range of about 90–120 degrees C., and then solidifying the resulting composition in the form of sticks.

8. A method of preparing a coloring dye stick which, upon being moistened with water, can be used to color paper and other surfaces and which is adapted readily to be washed from fabrics with soap and water, which consists essentially in admixing triethanolamine with a minor proportion of a water-soluble non-toxic organic dye at not substantially in excess of room temperature to effect solution or dispersion of said dye in the triethanolamine, then admixing therewith solid stearic acid, heating said mixture to a temperature in the range of about 90–120 degrees C., and then solidifying the resulting composition in the form of sticks.

9. A method of preparing a coloring dye stick which, upon being moistened with water, can be used to color paper and other surfaces and which is adapted readily to be washed from fabrics with soap and water, which consists essentially in admixing triethanolamine with a minor proportion of a water-soluble non-toxic organic dye at not substantially in excess of room temperature to effect solution or dispersion of said dye in the triethanolamine, then admixing therewith solid stearic acid, heating said mixture to a temperature in the range of about 90–120 degrees C., adding potassium stearate in an amount from about 25 to about 45% by weight of said dye stick, and then solidifying the resulting composition in the form of sticks.

10. A coloring dye stick, adapted upon moistening with water to be used to color paper and other surfaces and readily to be washed from fabrics with soap and water, consisting essentially of a normally solid water-soluble soap of an aliphatic amine with a higher molecular weight fatty acid, and a minor proportion of a water-soluble non-toxic organic dye substantially uniformly dispersed through said composition.

11. A coloring dye stick, adapted upon moistening with water to be used to color paper and other surfaces and readily to be washed from fabrics with soap and water, consisting essentially of a normally solid water-soluble soap of an hydroxy-alkyl amine with stearic acid, and a minor proportion of a water-soluble non-toxic organic dye substantially uniformly dispersed through said composition.

12. A coloring dye stick, adapted upon moistening with water to be used to color paper and other surfaces and readily to be washed from fabrics with soap and water, consisting essentially of a normally solid water-soluble soap of an aliphatic amine with a higher molecular weight fatty acid, potassium stearate in an amount from about 25 to about 45% by weight of said dye stick and a minor proportion of a water-soluble non-toxic organic dye substantially uniformly dispersed through said composition.

13. A coloring dye stick, adapted upon moistening with water to be used to color paper and other surfaces and readily to be washed from fabrics with soap and water, consisting essentially of a normally solid water-soluble soap of an hydroxy-alkyl amine with stearic acid, potassium stearate in an amount from about 25 to about 45% by weight of said dye stick and a minor proportion of a water-soluble non-toxic organic dye substantially uniformly dispersed through said composition.

14. A coloring dye stick, adapted upon moistening with water to be used to color paper and other surfaces and readily to be washed from fabrics with soap and water, comprising the following ingredients in substantially the following parts by weight:

| | |
|---|---|
| Normally solid water-soluble soap of an aliphatic amine with a higher molecular weight fatty acid | 40 to 60 |
| Potassium stearate | 25 to 45 |
| Water-soluble non-toxic organic dye | 1 to 5 |

15. A coloring dye stick, adapted upon moistening with water to be used to color paper and other surfaces and readily to be washed from fabrics with soap and water, comprising the following ingredients in substantially the following parts by weight:

| | |
|---|---|
| Normally solid water-soluble soap of an hydroxy-alkyl amine with a higher molecular weight fatty acid | 40 to 60 |
| Potassium stearate | 25 to 45 |
| Water-soluble non-toxic organic dye | 1 to 3 |

16. A coloring dye stick, adapted upon moistening with water to be used to color paper and other surfaces and readily to be washed from fabrics with soap and water, comprising the following ingredients in substantially the following parts by weight:

| | |
|---|---|
| Triethanolamine soap of stearic acid | 40 to 60 |
| Potassium stearate | 25 to 45 |
| Water-soluble non-toxic organic dye | 1 to 3 |

References Cited in the file of this patent

UNITED STATES PATENTS

| | | |
|---|---|---|
| 1,283,519 | Huffman | Nov. 5, 1918 |
| 1,564,234 | Gorcey | Dec. 8, 1925 |
| 1,764,006 | Cook | June 17, 1930 |
| 1,971,375 | Hoyt | Aug. 28, 1934 |
| 2,280,988 | Weiser | Apr. 28, 1942 |
| 2,404,298 | Kroll | July 16, 1946 |
| 2,600,943 | Valkenburgh | June 17, 1952 |

FOREIGN PATENTS

| | | |
|---|---|---|
| 415,930 | Great Britain | Sept. 6, 1934 |